(12) United States Patent
Leutwyler

(10) Patent No.: US 7,832,428 B2
(45) Date of Patent: Nov. 16, 2010

(54) SANITARY FITTING

(75) Inventor: André Leutwyler, Menziken (CH)

(73) Assignee: KWC AG, Unterkulm (CH)

( * ) Notice: Subject to any disclaimer, the term of this patent is extended or adjusted under 35 U.S.C. 154(b) by 779 days.

(21) Appl. No.: 11/808,897

(22) Filed: Jun. 13, 2007

(65) Prior Publication Data

US 2007/0295418 A1 Dec. 27, 2007

(30) Foreign Application Priority Data

Jun. 21, 2006 (EP) .................................. 06012694

(51) Int. Cl.
*E03C 1/042* (2006.01)

(52) U.S. Cl. ................ 137/801; 4/678; 4/695; 285/276; 285/321

(58) Field of Classification Search ................ 137/801; 4/675–678, 695; 285/139.1, 140.1, 276, 285/321

See application file for complete search history.

(56) References Cited

U.S. PATENT DOCUMENTS

| 3,221,572 | A | * | 12/1965 | Swick ........................ 74/502.4 |
| 3,701,505 | A | * | 10/1972 | Klumpp, Jr. ................. 248/56 |
| 4,131,379 | A | * | 12/1978 | Gordy et al. ................ 403/197 |
| 4,324,503 | A | * | 4/1982 | Sevrence .................... 403/197 |
| 4,592,388 | A | | 6/1986 | Wilcox |
| 5,171,429 | A | | 12/1992 | Yasuo |
| 5,299,593 | A | | 4/1994 | Ottelli |
| 5,868,311 | A | | 2/1999 | Cretu-Petra |
| 5,873,387 | A | | 2/1999 | Weber et al. |
| 5,960,830 | A | | 10/1999 | Hansen |
| 6,085,784 | A | | 7/2000 | Bloom et al. |
| 6,138,296 | A | | 10/2000 | Baker |
| 6,571,407 | B1 | | 6/2003 | Skarie |
| 6,684,906 | B2 | | 2/2004 | Burns et al. |
| 2003/0062087 | A1 | | 4/2003 | Burns et al. |

FOREIGN PATENT DOCUMENTS

| DE | 102 43 304 A1 | 4/2004 |
| EP | 0 471 249 B1 | 11/1994 |
| FR | 2 684 142 A1 | 5/1993 |
| JP | A 05-202540 | 8/1993 |
| JP | A 11-148155 | 6/1999 |
| JP | A 2000-336716 | 12/2000 |
| JP | A 2003-119854 | 4/2003 |

OTHER PUBLICATIONS

Computer generated translation for DE10243304.*

* cited by examiner

*Primary Examiner*—Craig M Schneider
(74) *Attorney, Agent, or Firm*—Oliff & Berridge, PLC

(57) ABSTRACT

Sanitary fitting comprising a basic element which is designed to be fastened to an object and has a passage defining an axis, a fitting part having a sleeve-shaped portion which in a free end region has a casing-side transverse groove, the sleeve-shaped portion reaching through the passage, being mounted in the basic element, and an annular, single-part guide clamp disposed coaxially to the axis and having a guide portion for the mounting of the fitting part in the basic element, and a latching portion for cooperation with the transverse groove configured as a ring groove. The guide clamp is fixed in the transverse groove and has between the guide portion and the latching portion a radial slot running in the peripheral direction. The latching portion protrudes radially outwards over the guide portion disposed in the passage and thereby cooperates with a mating shoulder configured on the basic element.

17 Claims, 4 Drawing Sheets

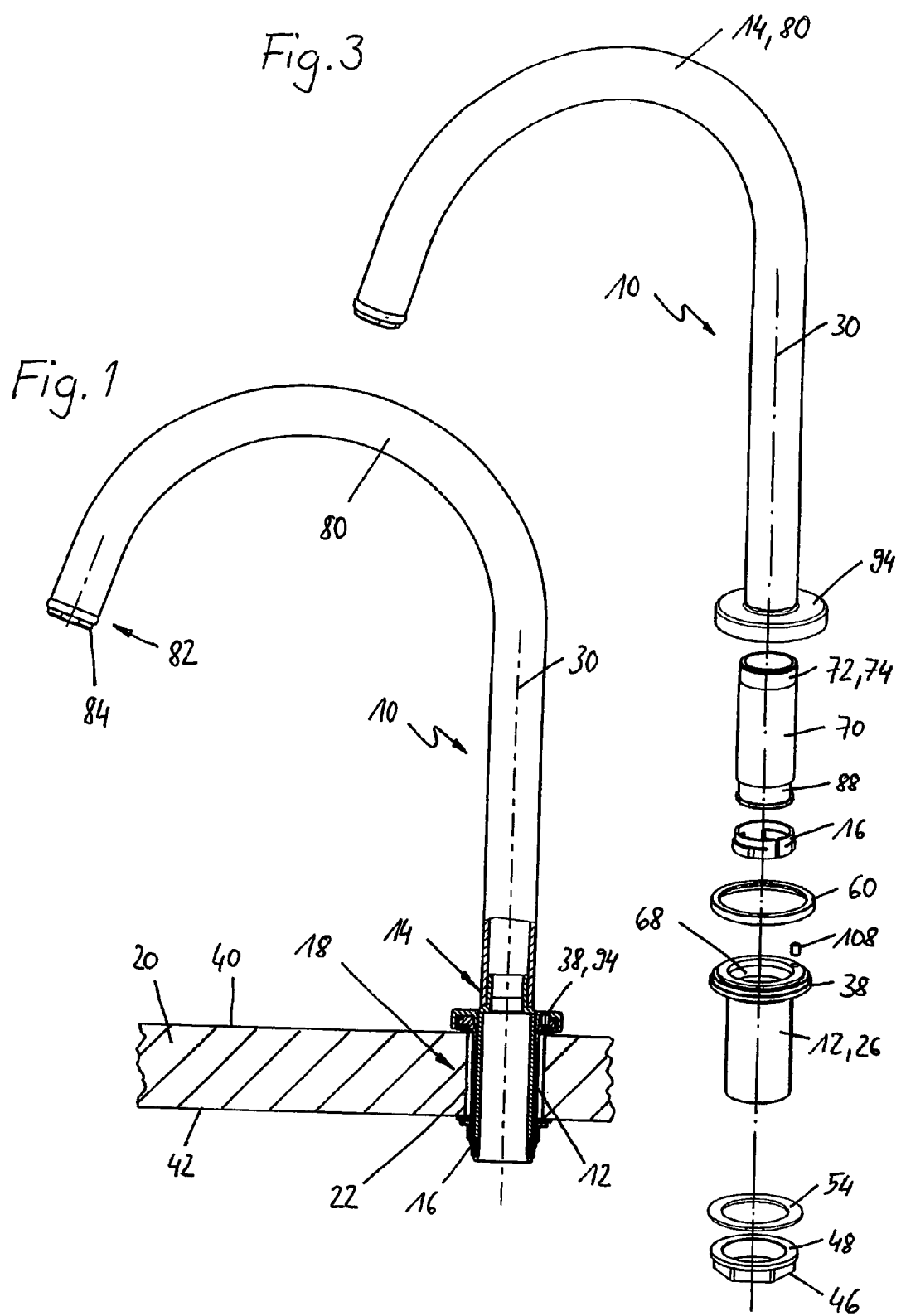

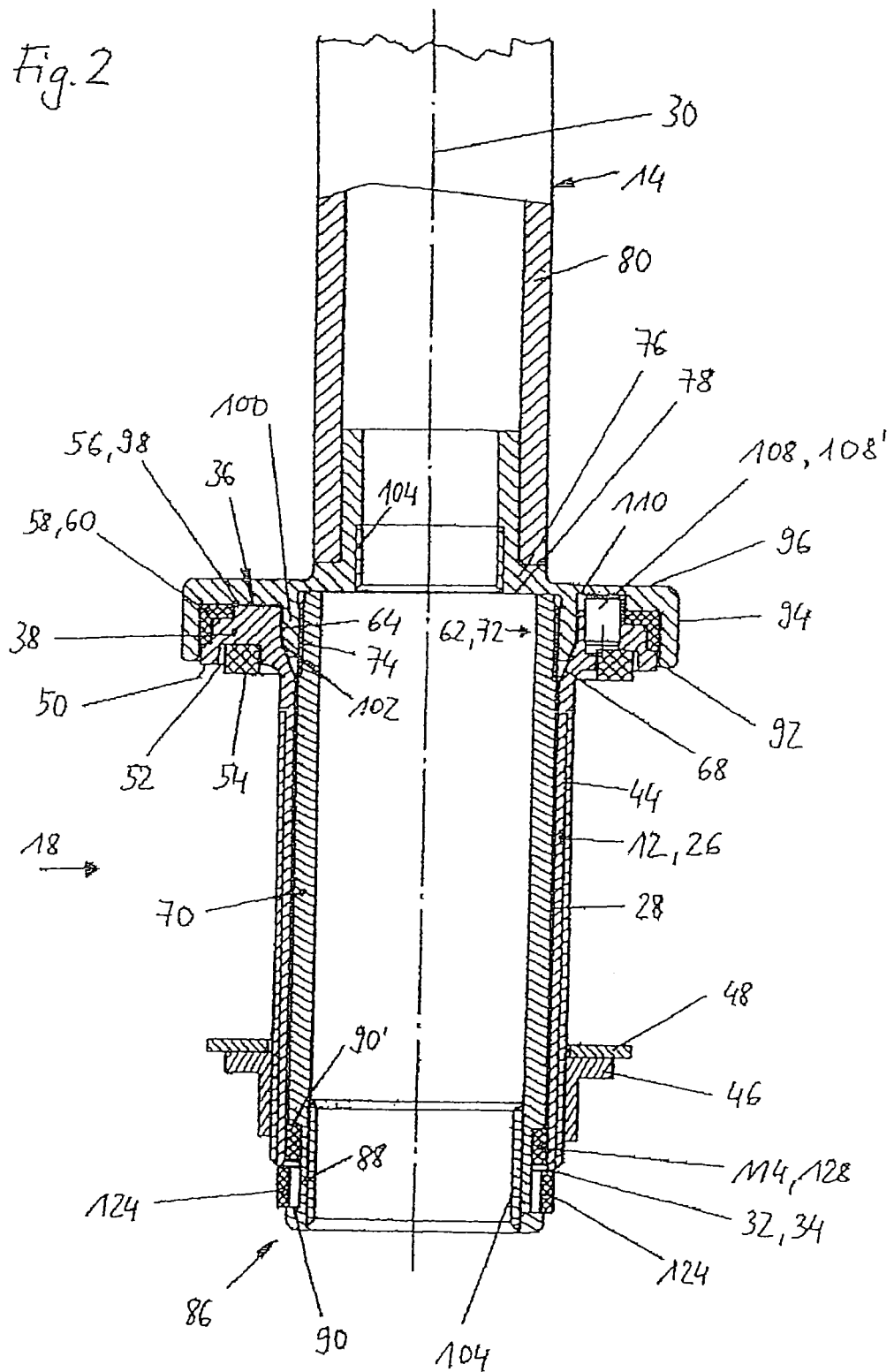

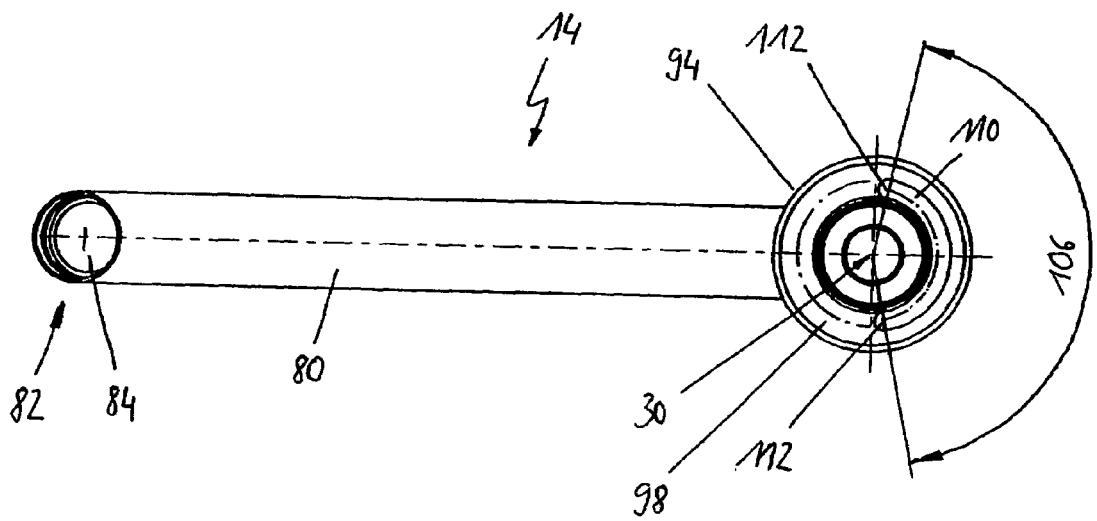
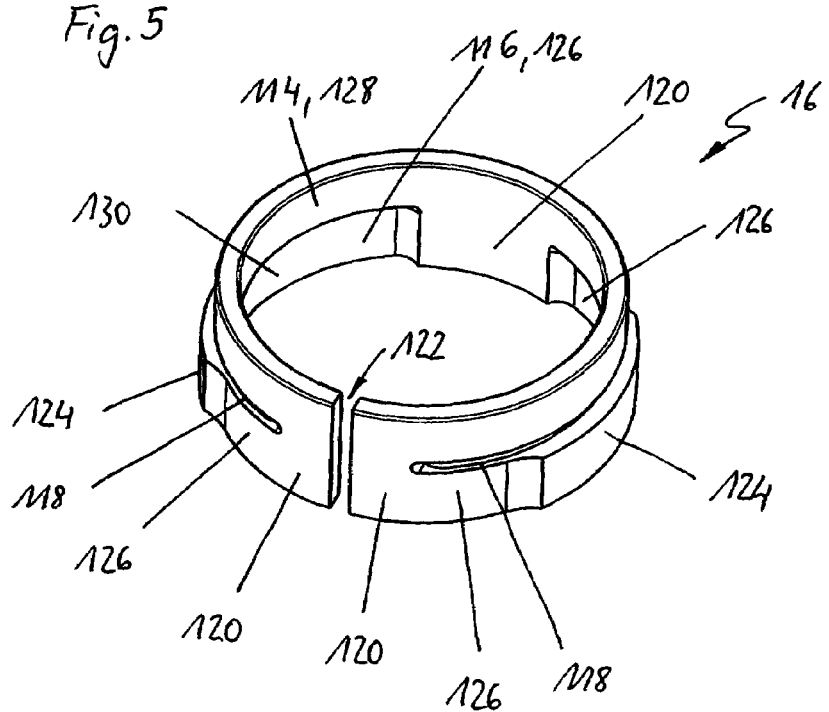

SANITARY FITTING

The present invention relates to a sanitary fitting and to a guide clamp.

JP 11148155 A discloses a sanitary fitting having a basic element and a fitting part held height-adjustably on the basic element by means of a guide clamp. The basic element can be fastened in a rotationally secure manner to a wash stand and has a passage which defines an axis. The fitting part comprises a shower head and a sleeve-shaped portion fixedly connected thereto, which latter penetrates the passage of the basic element and is mounted on the basic element, pivotably about the axis, by means of the guide clamp.

The basic element is of mushroom-shaped configuration and is fastened to the wash stand by a plurality of parts such that its mushroom head is disposed on a top side of the wash stand, i.e. on the user side. In the mushroom head there is disposed a circular-cylindrical recess, which runs concentrically to the axis and has an inner shoulder and an anti-twist mechanism, disposed on the said shoulder, for the twist-proof reception and casing-side support of the guide clamp. The guide clamp is fixed axially in the basic element by an end cap fastened to the basic element.

The fitting part is height-adjustable in the axial direction and can be engaged in two height positions on the guide clamp. The engagement facility is obtained by the fact that the sleeve-shaped portion, in both settings corresponding to the height positions, respectively has a pair of transverse grooves comprising casing-side transverse grooves running in the peripheral direction, the transverse grooves of each transverse groove pair being disposed diametrically opposite each other. Since the cassette-like, rectangular transverse grooves do not penetrate the sleeve-shaped portion, each transverse groove is limited in the axial direction by two transverse flanks running in the peripheral direction and inclined relative to the axis, and in the peripheral direction by two longitudinal flanks.

In a free end portion of the sleeve-shaped portion, a radially outward projecting end stop is fastened in such a way that the fitting part can be pulled axially out of the basic element maximally to the point where the end stop butts against an end face of the basic element.

The annular, single-part guide clamp has a circular-cylindrical body, which is self-contained in the peripheral direction, for the radial guidance of the fitting part, and an inner latching portion, which is designed to cooperate with the transverse grooves. This circular-cylindrical body is fixed in the recess with the inner shoulder in the basic element. In a lower half of the guide clamp in relation to the axis, two lamellar latching portions running in the peripheral direction are disposed diametrically opposite each other, which in the peripheral direction are respectively connected on both sides to the circular-cylindrical body by a lamellar spring element such that a kidney-shaped clearance is formed.

The axial guidance of the fitting part is effected, on the one hand, by guide portions of the guide clamp which lie diametrically opposite each other, are offset relative to the spring elements by ninety degrees about the axis and are directed radially inwards and which touch the sleeve-shaped portion of the fitting part in a segmentally guiding manner and, on the other hand, by an annular U-packing, which is disposed in a circumferential gap formed between the circular-cylindrical body and the sleeve-shaped portion of the fitting part, one side member of the U-packing resting on the inside against the circular-cylindrical body and the other side member holding the sleeve-shaped portion in a resilient and embracing manner and thereby centering it in the guide clamp.

If the sleeve-shaped portion is pulled in the axial direction, the transverse flanks of the transverse groove force the latching portions radially outwards to the point where, when reaching the second height position, they automatically engage again in the corresponding transverse grooves—insofar as the swivel position is maintained.

The object of the present invention is to allow a simple mounting of the fitting part on the basic element.

A further object of the present invention is to provide a particularly suitable guide clamp.

These objects are achieved with an inventive sanitary fitting, and with an inventive guide clamp.

Particularly preferred embodiments are defined in the dependent claims.

The invention is explained in greater detail below with reference to the drawings, in which, purely schematically, FIG. 1 shows in side view an embodiment of the inventive sanitary fitting, with part-section in the feed-through region;

FIG. 2 shows in longitudinal section and on an enlarged scale the feed-through region of the embodiment shown in FIG. 1;

FIG. 3 shows the sanitary fitting of the sanitary fitting shown in FIG. 1, in exploded representation;

FIG. 4 shows a bottom view of the fitting part shown in FIG. 1;

FIG. 5 shows a perspective view of the guide clamp shown in FIG. 1 to 3;

Figure 6:
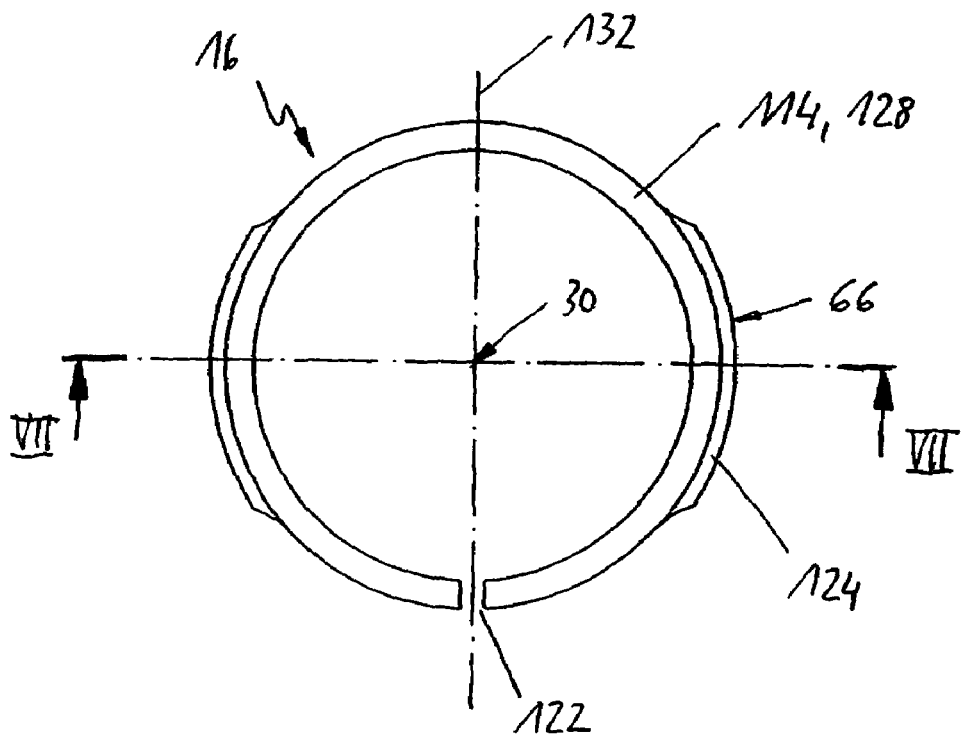
FIG. 6 shows a top view of the guide clamp shown in FIG. 5.

One embodiment of an inventive sanitary fitting 10, comprising a basic element 12, a fitting part 14 and a guide clamp 16, is shown in FIG. 1 to 4. It emerges from FIG. 1 that the inventive sanitary fitting 10 is fixed to an object 20 in a feed-through region 18. The term object 20 shall hereinafter be used to represent, for example, a built-in combination unit, a wash stand, a sink, of a wall etc. As is shown by the part-section in the feed-through region 18, which part-section is represented on an enlarged scale in FIG. 2, the object 20 has a circular-cylindrical feed-through 22, for example a table hole, having a feed-through diameter. In FIG. 2, the object 20 has been omitted for simplification purposes.

The basic element 12 having a tubular portion 26 has for the reception of the fitting part 14 a circular passage 28, which defines an axis 30. A free end face 32 of the tubular portion 26 is configured as a mating shoulder 34, which runs substantially at right angles to the axis 30 and is designed to cooperate with the guide clamp 16. In an end region 36 of the basic element 12, which end region lies opposite the mating shoulder 34, there is disposed a radially outward extending, circumferential basic element flange 38, which likewise runs at right angles to the axis 30.

The tubular portion 26 of the basic element 12 is pushed from the top side 40 of the object 20 into the feed-through 22 in such a way that the basic element flange 38, which has a diameter which is greater than a diameter of the feed-through 22 of the object, is located next to the top side 40 of the object 20 and the tubular portion 26 reaches through the feed-through 22 of the object 20 and projects from the bottom side 42 thereof.

The circular-cylindrical tubular portion 26 of the basic element 12 is provided with an external thread 44 so as to allow the basic element 12 to be fixed to the object 20 in a rotationally secure manner by means of a cap nut 46 which is screwed onto it. It emerges from FIG. 3 that a washer 48 is disposed between the bottom side 42 of the object 20 and the cap nut 46 so as to be able to compensate for assembly inaccuracies or geometric irregularities.

A bearing surface 50 of the basic element flange 38, which faces towards the top side 40 of the object 20, lies in the assembled state substantially flush with the top side 40 of the object 20. Incorporated into this bearing surface 50 is a circumferential, circular groove 52, which serves to receive a similarly shaped sealing ring 54. The depth of this groove 52 is dimensioned such that the sealing ring 54 projects slightly over the bearing surface 50 in the axial direction in order to compensate for any geometric irregularities, e.g. unevennesses, and/or seal off the feed-through 22 when the basic element 12 is mounted on the object 20.

In a radially outer region of a top side 56 of the basic element flange 38 there is disposed a cavity 58 of L-shaped cross-section, which serves to receive a similarly shaped bearing ring 60.

The basic element 12 has—distant from the mating shoulder 34—at the height of the basic element flange 38 an inner lead-in region 62, which lies adjacent to the top side 56 of the basic element flange 38 and serves to facilitate the introduction of the fitting part 14 with the premounted guide clamp 16. To this end, the lead-in region 62 has an inner cylindrical portion 64, which extends from the top side 56 of the basic element flange 38 in the axial direction roughly half-way through the basic element flange 38 and whose internal diameter is greater than the maximum diameter 66 of the guide clamp 16. Adjoining the inner cylindrical portion 64 there follows a conical, circumferential compressing flank 68, which tapers in the direction of the mating shoulder 34.

As emerges, in particular, from FIG. 2, the fitting part 14, in the feed-through region 18, is of multi-part configuration. A sleeve-shaped portion 70, which reaches through the passage 28, is connected in an end region 72 in a rotationally secure and leak-tight manner to a fitting part body 76 by a threaded joint 74 and bears on the end face flush against an inner shoulder 78 of the fitting part body 76. Fastened in a rotationally secure and leak-tight manner to the annular fitting part body 76 running concentrically to the axis 30 is a discharge pipe 80, which at its free end region 82 has a discharge mouth 84 in which, for example, an aerator can be disposed.

In a free end region 86 of the sleeve-shaped portion 70 there is disposed a transverse groove 88, configured as a circumferential ring groove, of rectangular cross section, the groove flanks 90, 90' of which run substantially at right angles to the axis 30. The annular groove 88 serves for the axially-fixing reception of the annular guide clamp 16 disposed coaxially to the axis 30.

Into a bottom side 92 of a fitting part flange 94 of the fitting part body 76, which bottom side runs substantially parallel to a top side 96 of the fitting part flange 94, there is moulded a downwardly (FIG. 2) open, circumferential inner groove 98 of approximately rectangular cross section. In the assembled state, the basic element flange 38 is accommodated in this inner groove 98 in such a way that the fitting part flange 94 covers the basic element flange 38 at least approximately up to its bearing surface 50. The inner groove 98 is disposed in the fitting part flange 94 such that radially on the inside a circumferential, annular connecting collar 100 is formed. The connecting collar 100 has an internal thread of the threaded joint 74 for the screwing-in of the sleeve-shaped portion 70, as well as a circumferential, conical outer shoulder 102, which is tapered in the direction of the ring groove 88 and serves for centering during the assembly process.

In the fitting part body 76 and in the sleeve-shaped portion 70 there are disposed internal threads 104, which serve as connecting means 104 for an inflow pipe (not shown). The option thus exists of connecting the inflow pipe, according to requirement, to the fitting part body 76 or to the sleeve-shaped portion 70.

The L-shaped bearing ring 60 is disposed in the cavity 58 of the basic element flange 38 such that it projects radially and axially therefrom so as to cooperate with the circumferential inner groove 98 of the fitting part flange 94 such that the fitting part 14 is mounted radially and axially on the basic element 12.

For the limitation of a swivel range 106, a stop body 108 in the form of a pin 108 is inserted in the basic element flange 38 from the top side 56 of the basic element flange 38. As can be seen, in particular, from FIG. 4, from the groove bottom of the inner groove 98 of the fitting part flange 94, in the axial direction, a circular-arc-shaped track 110 is moulded into the fitting part flange 94. The track 110 runs almost 180° concentrically about the axis 30 and is limited by a respective periphery-side track end region 112. The pin 108 engages in the track 110 and cooperates with the track end regions 112 in such a way that the swivel range 106 of the fitting part 14 relative to the basic element 12 is limited to around 180°.

Figure 7:
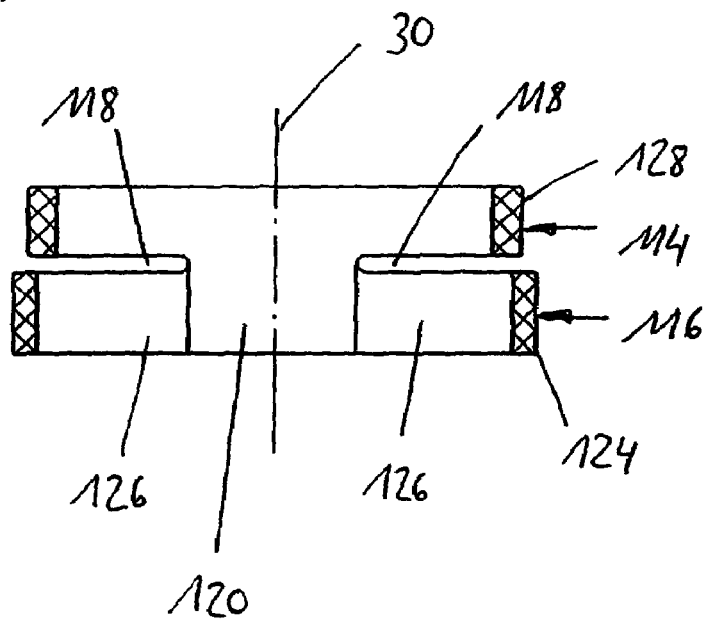
FIG. 7 shows a sectional representation of the guide clamp shown in FIG. 6, along the line VII-VII.

The guide clamp 16 shown in FIG. 5 to 7 is shaped such that it can perform a number of functions. On the one hand, it can ensure the radial guidance of the sleeve-shaped portion 70 of the fitting part 14 in the basic element 12, whilst on the other hand it can act, at the same time, as a protection to prevent reliably and with simple means the fitting part 14 from being pulled out of the basic element 12, for example in an act of vandalism. Despite this, the inventive guide clamp 16 can not only allow, but can promote both a simple mounting and a simple removal of the fitting part 14 on and from the basic element 12.

The guide clamp 16 has a first and a second annular clamp portion 114 and 116, which are disposed one behind the other in the direction of the axis 30 and are partially separated from each other by two radial slots 118 running in the peripheral direction and are joined together merely by webs 120, the webs 120 being disposed between the radial slots 118 in the peripheral direction.

As can be seen in FIGS. 2, 5 and 7, the first (upper) clamp portion 114 has substantially an annular cylindrical shape of substantially constant wall thickness.

From FIGS. 5 and 6 it can be seen that both clamp portions 114, 116 are once interrupted by an interstice 122 running in the axial direction and orientated radially to the axis 30. The interstice 122 is disposed in the region of a web 120 and serves to be able to radially widen the guide clamp 16, by utilizing its spring characteristics, so as to be able to slide it over the sleeve-shaped portion 70 of the fitting part 14 into the ring groove 88 (see FIG. 2). Following the radial widening, the guide clamp 16 automatically springs back at least approximately into its previous shape.

The second (lower) clamp portion 116 has respectively next to the two radial slots 118 a latching portion 124, which is disposed roughly centrally in relation to the radial slot 118 in the peripheral direction and extends in the peripheral direction roughly over two thirds of the slot length of the radial slot 118. In the peripheral direction, each latching portion 124 is connected by a lamellar spring element 126 to a web 120 and thus to the first clamp portion 114, the spring element 126 being located in the region of the radial slot 118.

A guide portion 128 of the guide clamp 16 is formed by the webs 120 and the first clamp portion 114 of substantially constant wall thickness.

Whilst the latching portions 124 protrude radially outwards over the guide portion 128, the lamellar spring elements 126 and the webs 120 are aligned on the casing side with the first, top clamp portion 114. Radially on the inner side, only the webs 120 are aligned with the first clamp portion 114, whilst the spring elements 126 and the latching portions 124 are offset radially outwards from the first clamp portion 114, in terms of their inner contour, by a recess 130, whereby the wall thickness of the spring element 126 still measures approximately half the wall thickness of the guide portion 128, and the wall thickness of the latching portion 124 measures roughly two thirds of that of the guide portion 128, as is shown by FIG. 7. The spring elements 126, which are tapered in terms of their wall thickness, improve the spring characteristics of the latching portions 124 and, above all, of the spring elements 126 in the radial direction, in addition to the material-dictated characteristics of the guide clamp 16, thereby enabling the latching portion 124 to be forced away elastically radially inwards by means of a purely radially acting transverse force.

As FIG. 5 illustrates, the guide clamp 16 has a total of three webs 120, the web 120, which lies diametrically opposite the interstice 122, being realized twice as wide as the two webs 120 disposed on either side of the interstice 122.

As emerges from FIG. 6, the guide clamp 16 is constructed in mirror symmetry in relation to a plane 132 of the interstice 122. The maximum diameter 66 of the guide clamp 16 is measured diagonally over the two latching portions 124 of the guide clamp 16 in the basic setting transversely to the plane 132.

By virtue of the above-stated construction, the latching portions 124 of the guide clamp 16 have, on the one hand, high rigidity in the axial direction and, on the other hand, high springiness in the radial direction.

In the assembled state (see FIG. 2), the passage 28 is guided on the peripheral side full-facedly through the first (upper) clamp portion 114 excluding the interstice 122, whilst the sleeve-shaped portion 70 of the fitting part 14 is guided through the whole of the guide portion 128—i.e. excluding the interstice 122—on the inner side full-facedly against the groove bottom of the circumferential transverse groove 88.

The one-piece guide clamp 16 is preferably injection-moulded from plastic, polyamide preferably being chosen as the plastic. It is entirely conceivable, however, also to use other materials, for example polyoxymethylene (POM), insofar as they satisfy the necessary antifriction characteristics and/or spring characteristics, for which elastomeric agents are preferred.

In this context, it is possible to define the wall thickness in the region of the spring elements 126 in dependence on the chosen material for the guide clamp 16, whereby the transverse force which is necessary to force the latching portions 124 radially inwards is adjustable.

As emerges, in particular, from FIG. 2, the latching portions 124 of the guide clamp 16 protrude radially outwards over the guide portion 128 in such a way that they axially cooperate with the mating shoulder 34 and the, in FIG. 2, bottom groove flank 90 of the ring groove 88 such that the fitting part 14 is prevented from being pulled out of the basic element 12. The basic element 12 is thereby axially fixed between the fitting part flange 94 and the latching portions 124.

When mounting the fitting part 14 on the basic element 12, the following procedure is adopted. The guide clamp 16 is inserted into the ring groove 88 in such a way that the latching portions 124 are located on the side of the free end region 86 of the sleeve-shaped portion 70. A special assembly step for orientating the guide clamp 16 with respect to its rotational position relative to the axis 30 is not necessary, since the guide clamp 16 can fulfil its functions irrespective of its rotational position in relation to the basic element 12. The sleeve-shaped portion 70 is then introduced into the lead-in region 62 of the passage 28 of the basic element 12. Whilst the inner cylindrical portion 64 serves merely for the precentering, the latching portions 124 on the compressing flank 68 of the basic element 12 are pushed inwards in the radial direction towards the axis 30. The fact that the wall thickness of the latching portions 124 is less than or equal to the wall thickness of the guide portion 128 makes it easier to introduce the fitting part 14 into the passage 28. The fitting part 14 is pushed further in the direction of the mating shoulder 34 to the point where the fitting part flange 94 embraces the basic element flange 38 and bears axially against the latter, or against the bearing ring 60. In this setting, the latching portions 124 of the guide clamp 16 automatically spring radially outwards and cooperate with the mating shoulder 34 and with the lower groove flank 90 of the ring groove 88 in the manner set out above.

In the present case, the ring groove 88 is axially dimensioned such that the fitting part 14 can be effortlessly rotated in the stationary basic element 12 about the axis 30, yet does not permit significant axial displacement and prevents pulling out in the axial direction. In the event of an attempt to pull the fitting part 14 out of the basic element 12, the latching portions 124 of the guide clamp 16 are axially pressed together between the groove flank 90 of the ring groove 88 which faces the mating shoulder 34 and the mating shoulder 34. Since the groove flank 90 of the ring groove 88 which faces the mating shoulder 34 and the mating shoulder 34 run substantially at right angles to the axis 30, in the attempt to pull the sleeve-shaped portion 70 out of the basic element 12 no transverse force, which can move the latching portions 124 in the radial direction, is generated. Thus, once the fitting part 14 is mounted, the mating shoulder 34 has no influence upon the forcing back of the latching portions 124 radially inwards.

The axial extent of the latching portions 124 can be chosen in accordance with the strength of the material of the guide clamp 16.

The fact that the latching portions 124 act simultaneously as an end stop renders a separate end stop in the axial direction to the axis 30 superfluous.

In the above-described embodiment of the sanitary fitting 10 of the present invention, a two-point contact bearing for the fitting part 14 is formed by the spatial axial separation of the bearing ring 60 and the guide clamp 16, which is likely to have a positive effect upon the stability of the said fitting part.

For the removal of the fitting part 14 from the basic element 12, the latching portions 124 projecting radially over the mating shoulder 34 of the basic element 12 are first pressed together by means of a tool, or preferably by hand, whereupon these are forced back radially to the axis 30 inwards into the ring groove 88 and the fitting part 14 is then pulled out of the basic element 12.

It is imaginable that the mating shoulder 34 is sunken in the basic element 12. In such an embodiment, the passage 28 would then end next to the mating shoulder 34.

It is also conceivable that the guide clamp 16 has only one, or else more than the two described latching portions 124.

It is likewise conceivable that the guide portion 128 is shaped such that it guides the fitting part 14 in the basic element 12 merely punctiformly, instead of full-facedly on the casing side and/or on the inner side, for example in order to reduce the sliding friction.

The interstice 122 can have any chosen shape, as long as the mountability and the functioning of the guide clamp 16 on the sleeve-shaped portion 70 is ensured.

It is also possible for the guide clamp 16 not to be slit by an interstice 122, if the sleeve-shaped portion 70 is correspondingly multi-part construction.

Moreover, it is conceivable that the web(s) 120 of the guide portion 128 are tapered in terms of their wall thickness such that the radial guidance of the sleeve-shaped portion 70 is effected solely by the first clamp portion 114.

In addition to all this, it would also be conceivable to integrate the guide clamp 16 on the sleeve-shaped portion 70 of the fitting part 14. It would in this case be possible to design the free end region 86 of the sleeve-shaped portion 70 correspondingly as a guide portion 128 for guidance in the passage 28 of the basic element 12. Analogously to the above-made description, the latching portion 124 would be separated from the guide portion 128 by a radial slot 118 running in the peripheral direction and would nevertheless be connected to the latter. In this embodiment, the interstice 122 could be dispensed with, since a premounting of the guide clamp 16 into the transverse groove 88 of the sleeve-shaped portion 70 is no longer necessary. Thus, the number of parts could be further curtailed, the assembly steps further reduced and the mounting of the fitting part 14 in the basic element 12 further simplified.

If the groove flanks 90, 90' of the transverse groove, or ring groove 88, in particular the groove flank 90 of the sleeve-shaped portion 70 which faces the mating shoulder 34 of the basic element 12, is inclined not at right angles to the axis 30, but rather at an angle to the latter, which sleeve-shaped portion is dimensioned such that, with a correspondingly matched latching portion 124, a self-locking effect is nevertheless obtained, such an embodiment could likewise be used.

Of course, it is also possible to dispense with the internal thread 104 in the fitting part 14 and instead to provide a different connecting means 104, for example a plug coupling.

Moreover, it is also conceivable to produce the fitting part body 76 and the sleeve-shaped portion 70 together, i.e. in one piece. Similarly, it is conceivable to produce the whole of the fitting part 14, at least in the feed-through region 18, in one piece.

The fitting part 14 can be, for example, a swivel spout or a fitting housing.

The swivel range 106 can extend, for example, also over 120.degree. or over 300.degree. In this case, the track 110 in the fitting part flange 94 can be correspondingly longer or shorter. It is also conceivable to limit the swivel range 106 by means of a further pin-shaped stop body 108', which is disposed with the abovementioned pin-shaped stop body 108 on a common graduated circle. Similarly, it is conceivable for the stop body 108 to be moulded directly onto the basic element flange 38, whereby the number of parts could be further reduced.

Moreover, it is also conceivable to dispose the stop body 108 and the track 106, or a different limiting means for limiting the swivel range 106, on the peripheral side between the fitting part flange 94 and the basic element flange 38, whereby the structural height of the bearing surface 50 to the top side 96 of the fitting part flange 94 could be reduced.

In addition, it is imaginable that the bearing ring 60 is used only for the radial or only for the axial support of the fitting part flange 94 on the basic element flange 38 and that it, together with the thereto assigned cavity 58 for the bearing ring 60, can therefore have a correspondingly different shape.

Under given circumstances, for example in the case of a fitting part 14 which is not intended to be swivelled about the axis 30, it is entirely imaginable to dispense wholly or partially with the bearing ring 60 disposed between the fitting part flange 94 and the basic element flange 38.

Although the described embodiment of the sanitary fitting 10 concerns a so-called swivel fitting, whose parts in the feed-through region 18 are illustrated in summary form in FIG. 2, it is imaginable that the same structure may also be used for a non-swivelable fitting part 14. In this case, an anti-twist securement could be realized, for example by means of a cylinder pin or a screw which fixes the fitting part flange 94 to the basic element flange 38.

The invention claimed is:

1. Annular, single-part guide clamp for a sanitary fitting, comprising:
    an annular guide portion;
    a latching portion connected on both sides, as seen in a circumferential direction, by lamellar spring elements to the annular guide portion;
    a radial slot running in a peripheral direction and disposed between, on one side the annular guide portion, and the other side, the latching portion and the lamellar spring elements;
    a radially inner contour of the lamellar spring elements and the latching portion being offset radially outwards by a recess;
    relative to the annular guide portion, the latching portion protruding radially outwards over the annular guide portion and being configured to be forced elastically radially inwards; and
    the lamellar spring elements being tapered in terms of wall thickness relative to the latching portion and the annular guide portion.

2. Guide clamp according to claim 1, wherein two latching portions lie diametrically opposite each other.

3. Guide clamp according to claim 1, wherein the guide clamp is slit by an interstice running in the axial direction and radial direction.

4. Guide clamp according to claim 1, wherein the wall thickness of the latching portion is less than or equal to the wall thickness of the annular guide portion.

5. Guide clamp according to claim 1, wherein the guide clamp is made of plastic.

6. Sanitary fitting comprising a basic element which is designed to be fastened to an object and has a passage defining an axis, a fitting part having a sleeve-shaped portion which has a transverse groove on a casing side and which, reaching through the passage, is mounted in the basic element, and an annular, single-part guide clamp disposed coaxially to the axis and having a guide portion for the mounting of the fitting part in the basic element, and a latching portion, wherein the transverse groove is disposed on the casing side in a free end region of the sleeve-shaped portion and the guide clamp is fixed in the transverse groove, the guide clamp has between the guide portion and the latching portion a radial slot running in a peripheral direction, the latching portion protrudes radially outwards over the guide portion disposed in the passage and thereby cooperates with a mating shoulder configured on the basic element in order to prevent the fitting part from being pulled out of the basic element.

7. Sanitary fitting according to claim 1, wherein the latching portion can be forced back elastically radially inwards, the mating shoulder of the basic element being ineffectual with respect to the forcing back.

8. Sanitary fitting according to claim 1, wherein the transverse groove is circumferential and the guide clamp is slit in the axial direction by an interstice.

9. Sanitary fitting according to claim 1, wherein the fitting part has at least one connecting means, optionally an internal thread, for the connection of an inflow pipe.

10. Sanitary fitting according to claim 1, wherein the latching portion, in the peripheral direction, is connected by a lamellar spring element to the guide portion, the spring element being tapered in terms of its wall thickness relative to the latching portion and the guide portion.

11. Sanitary fitting according to claim 1, wherein a wall thickness of the latching portion is less than or equal to a wall thickness of the guide portion.

12. Sanitary fitting according to claim 1, wherein the guide clamp is made of plastic.

13. Sanitary fitting according to claim 1, wherein the passage, in a portion distant from the mating shoulder, has a circumferential, optionally conical compressing flank, which is tapered in the direction of the mating shoulder and serves to make it easier for the sleeve-shaped portion, with the guide clamp disposed in the transverse groove, to be introduced into the passage and to force back the latching portion radially inwards.

14. Sanitary fitting according to claim 13, wherein the basic element, optionally next to the compressing flank, has a radially outwards projecting basic element flange having a bearing surface which is designed to be facing the object, and a fitting part flange of the fitting part covers the basic element flange at least approximately up to the bearing surface.

15. Sanitary fitting according to claim 14, wherein between the basic element flange and the fitting part flange there is disposed an axially and/or radially acting bearing ring.

16. Sanitary fitting according to claim 1, wherein the sleeve-shaped portion is fixedly connected to a discharge pipe and is mounted in the basic element pivotably about the axis.

17. Sanitary fitting according to claim 16, wherein the basic element has a stop body, which engages in a track of the fitting part in order to limit a swivel range of the fitting part.

* * * * *